United States Patent
Baumgartner (10) Patent No.: US 7,808,759 B2
(45) Date of Patent: Oct. 5, 2010

(54) METHODS AND APPARATUSES FOR PERFORMING COMMON MODE PULSE COMPENSATION IN AN OPTO-ISOLATOR

(75) Inventor: Richard A. Baumgartner, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 284 days.

(21) Appl. No.: 11/766,333

(22) Filed: Jun. 21, 2007

(65) Prior Publication Data

US 2008/0316668 A1    Dec. 25, 2008

(51) Int. Cl.
*H02H 9/08* (2006.01)

(52) U.S. Cl. .................... 361/93.9; 361/111

(58) Field of Classification Search ............ 361/111, 361/93.9; 323/276
See application file for complete search history.

(56) References Cited

U.S. PATENT DOCUMENTS

| | | | | |
|---|---|---|---|---|
| 4,568,838 A | * | 2/1986 | Honda et al. ............... 327/487 |
| 5,043,587 A | * | 8/1991 | Miki et al. .................. 250/551 |
| 5,089,948 A | * | 2/1992 | Brown et al. ................ 363/58 |
| 5,465,298 A | * | 11/1995 | Wilkison et al. ....... 379/406.02 |
| 6,586,890 B2 | * | 7/2003 | Min et al. ................... 315/224 |
| 7,253,997 B2 | * | 8/2007 | Balakrishnan et al. ........ 361/18 |
| 7,420,335 B2 | * | 9/2008 | Robinson et al. ............ 315/224 |
| 7,482,666 B2 | | 1/2009 | Holcombe et al. |
| 2003/0048008 A1 | * | 3/2003 | Castagnet et al. ........... 307/131 |
| 2005/0225976 A1 | * | 10/2005 | Zampini et al. ............. 362/227 |
| 2007/0115248 A1 | * | 5/2007 | Roberts et al. .............. 345/102 |
| 2008/0062606 A1 | * | 3/2008 | Brown et al. ................ 361/111 |
| 2008/0169834 A1 | * | 7/2008 | Chen et al. .................... 326/21 |
| 2008/0292325 A1 | | 11/2008 | Chen et al. |
| 2008/0308817 A1 | | 12/2008 | Wang et al. |
| 2008/0315925 A1 | * | 12/2008 | Alfano et al. ............... 327/103 |

OTHER PUBLICATIONS

Hewlett-Packard, "Insulation and Regulation of Optically Coupled Isolation Devices", http://www.secomtel.com/UpFilesPDF/PDF/Agilent/PDF_DOCS/ISONCONT/01OPTO/optocouplerdg.pdf Nov. 12, 1999.

* cited by examiner

*Primary Examiner*—Ronald W Leja
*Assistant Examiner*—Christopher J Clark (57) ABSTRACT

In an opto-isolator, common mode pulses that occur are compensated for by either adding current to the electrical-to-optical converter (EOC) drive current to compensate for a decrease in the EOC drive current caused by the occurrence of a common mode pulse or by pulling some of the drive current away from the EOC to compensate for an increase in the EOC drive current caused by the occurrence of a common mode pulse.

16 Claims, 5 Drawing Sheets

METHODS AND APPARATUSES FOR PERFORMING COMMON MODE PULSE COMPENSATION IN AN OPTO-ISOLATOR

TECHNICAL FIELD OF THE INVENTION

The invention relates to opto-isolators, and more particularly, to performing common mode pulse compensation in an opto-isolator.

BACKGROUND OF THE INVENTION

An opto-isolator is a device that transfers a signal optically between two electrical circuits while, at the same time, electromagnetically isolating the circuits from each other. Opto-isolators are used to protect circuits against damage from voltage surges. A transmitter circuit on the transmitter side of the opto-isolator comprises an electrical-to-optical converter, such as a visible or infrared light emitting diode (LED), that converts the electrical signal into an optical signal. A receiver circuit on the receiver side of the opto-isolator comprises an optical-to-electrical converter, such as a photodiode, that converts the optical signal back into an electrical signal.

The transmitter and receiver circuits of an opto-isolator are typically integrated circuits (ICs). It is desirable to integrate these ICs within the same IC package in order to keep the overall size of the opto-isolator small. However, the close proximity of the transmitter and receiver circuits results in capacitive coupling between the ground reference of the receiver IC and the leads that drive the transmitter LED. This capacitive coupling can cause the common mode pulses between the ground reference points of the two circuits to either increase or decrease the drive current on the LED leads. This increased or decreased drive current can affect the On and Off states of the LED, and consequently, the performance of the opto-isolator.

Figure 1:
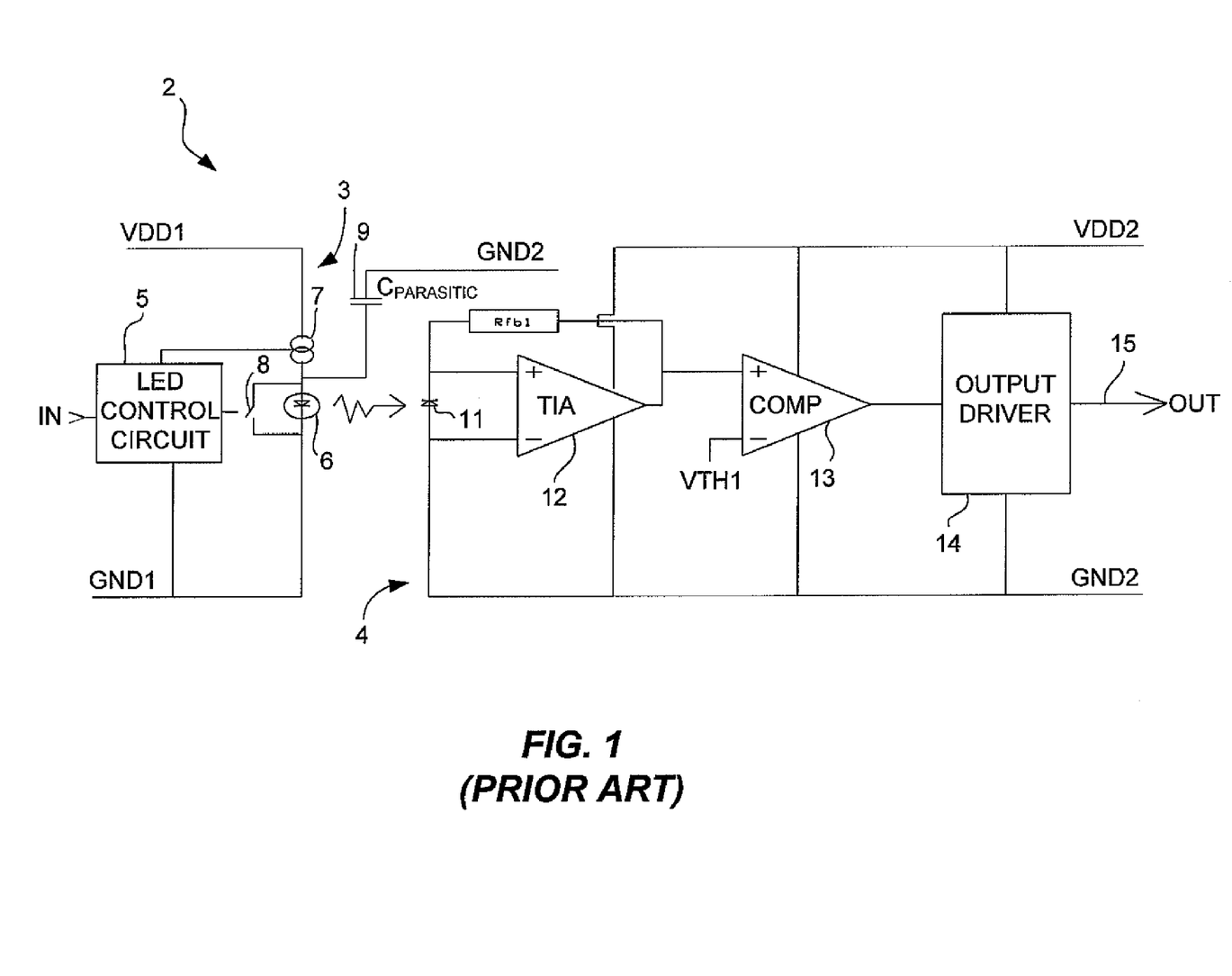
FIG. 1 illustrates a block diagram of a known opto-isolator having a transmitter IC and a receiver IC.

FIG. 1 illustrates a block diagram of a typical opto-isolator 2 having a transmitter IC 3 and a receiver IC 4. The transmitter IC 3 includes an LED control circuit 5 having input interface logic (not shown) for receiving an electrical input signal, and an LED driver circuit (not shown) for generating a drive current that drives an LED 6. The LED 6 is typically separate from the transmitter IC 3 and is usually made using a III-V process technology. The LED 6 is connected by wire bonds (not shown) to the transmitter IC 3. A supply voltage VDD1 and a ground reference GND1 are provided to the transmitter IC 3. The transmitter IC 3 includes a current source 7 for turning the LED 6 on and a shorting switch 8 for ensuring that the LED 6 is turned off when it is supposed to be in the Off state. The transmitter IC 3 also includes an input logic interface (not shown). There is a small, but significant, stray parasitic capacitance between the bond wires going to the LED 6 and the ground reference, GND2, node of the receiver IC 4. This parasitic capacitance is represented by capacitor 9.

The receiver IC 4 includes a silicon photodiode 11, a transimpedance amplifier (TIA) 12, a comparator 13 and an output driver 14. The optical output of the LED 6 is coupled to the photodiode 11 on the receiver IC 4. The photon input to the photodiode 11 produces a corresponding photo current in the diode 11. This current is amplified in the TIA 12 and then the output is sent to the comparator 13. The comparator 13 compares the output from the TIA 12 to a reference voltage, VTH1, to determine whether the output corresponds to a logic 0 or logic 1 state and provides an output signal to the output driver 14, which produces the output drive signal for the opto-isolator 2 at node 15.

Typically, the operations of the TIA 12, the comparator 13, and the output driver 14 result in a logic 0 being output from the opto-isolator 2 at node 15 if the LED 6 is turned on and the receiver photo current is above the threshold level VTH1. A logic 1 will occur if the LED 6 is turned off. This works well if there is not a significant interfering signal between the transmitter IC 3 and the receiver IC 4. A common mode interference is defined as a signal between the GND1 and GND2 reference points. A key function of the opto-isolator 2 is to permit the transfer of logic signals between two different electrical systems that may be operating at substantially different voltage potentials. This key function is performed well as long as there is not an excessive transient component between the two ground reference points. An excessive transient component is a signal that will disrupt the operation of the isolator.

If the slope of the waveform representing the common mode pulse between the GND1 and GND2 references has a slope greater than about 10 KV/μsec, there will be significant current pulled from the bond wires going to the LED 6 through the parasitic capacitor 9. The relationship between this slope, the parasitic capacitance and the current pulled away from the LED 6 is expressed as:

$$I\_error = Cparasitic * dV/dT,$$

where I_error represents the portion of the drive current pulled away from the LED 6 by the parasitic capacitor 9, Cparasitic represents the parasitic capacitance, and dV/dT represents the slope of the common mode pulse. Using this equation, it can be determined that for a common mode pulse having a slope of 10 KV/μsec, the current I_error through a typical Cparasitic value of 50 femtofarads (fF) is 0.5 milliamperes (mA). This current level is relatively high, which means that a significant portion of the drive current for the LED 6 has been pulled through the parasitic capacitance and thereby diverted from the LED 6. This reduces the optical output of the LED 6 and may cause the corresponding signal output from the TIA 12 to drop below the threshold level of the comparator 13, resulting in errors occurring during the operation of the opto-isolator 2.

During an experiment, it was observed that for a common mode signal between GND1 and GND 2 having a slope of 30 KV/usec and Cparasitic=100 fF, the reduction of the LED drive current due to losses through Cparasitic causes the optical output of the LED 6 to be reduced to the point that errors occurred. The reduction in the drive current caused the electrical output from the photodetector 11 to be reduced, which, in turn, caused the voltage signal output from the TIA 12 to drop below the threshold voltage VTH1 of the comparator 13. When this happened, a single LED On pulse received by the receiver 4 resulted in two output pulses at the output node 15 of the opto-isolator 2, which is an improper result.

The traditional approach used to correct this problem is to decrease the size of the parasitic capacitance between the bond wires to the LED 6 and GND2. This can help, but as the IC package geometries become smaller, the dimensions between elements with potential for parasitic capacitances make this adjustment more difficult to achieve. Another approach used to correct this problem is to increase the LED drive current to the point that the perturbations in the drive current caused by the occurrence of common mode pulses between GND1 and GND2 no longer affect the On state of the LED. The use of increased LED drive current, however, also increases the power consumption of the opto-isolator, which is in direct conflict with the dual goals of providing lowpower operation in opto-isolators and adequate isolation in various technological applications.

Accordingly, a need exists for a way to correct problems in opto-isolators that are caused by the effects of common mode pulses between the ground references GND1 and GND2 of the transmitter and receiver ICs 3 and 4 and the parasitic capacitance between the wire bonds to the LED 6 and GND2.

SUMMARY OF THE INVENTION

The invention provides methods and apparatuses for compensating for the effects of common mode pulses that occur in the opto-isolator. The apparatus is an opto-isolator comprising a transmitter circuit, an electrical-to-optical converter (EOC) and a receiver circuit. The transmitter circuit has an EOC control circuit for controlling an EOC, a primary current source for generating a drive current for driving an EOC, an auxiliary current source for providing a corrected drive current for driving an EOC by increasing or decreasing the drive current generated by the primary current source, and a sensor for sensing if a transient event has occurred, and if so, providing information about the transient event to the auxiliary current source. The EOC is operatively connected to the transmitter circuit and receives the corrected EOC drive current when the EOC control circuit causes the corrected drive current to be provided to the EOC. The EOC produces an optical signal based on the received corrected EOC drive current. The receiver circuit has an optical-to-electrical converter (OEC), an amplifier, a comparator and an output driver. The OEC receives the optical signal produced by the EOC and converts the optical signal into an electrical signal. The amplifier amplifies the electrical signal received from an output of the OEC. The comparator compares the amplified electrical signal to a reference signal and produces an electrical output signal based on the comparison. The output driver receives the electrical output signal and produces an electrical output drive signal for the opto-isolator.

The method comprises using a sensor to detect whether a common mode pulse waveform has occurred in an opto-isolator, sending information about the common mode pulse occurrence to an auxiliary current source of the opto-isolator, receiving the information about the common mode pulse waveform occurrence in the auxiliary current source, and, based on the received information, increasing or decreasing an EOC drive current generated by a primary current source to provide a corrected EOC drive current to the EOC of the opto-isolator.

These and other features and advantages of the invention will become apparent from the following description, drawings and claims.

DETAILED DESCRIPTION OF AN ILLUSTRATIVE EMBODIMENT

In accordance with the invention, common mode pulses that occur in an opto-isolator are compensated by either adding current to the LED drive current to compensate for a decrease in the LED drive current caused by the occurrence of a common mode pulse or by pulling some of the drive current away from the LED to compensate for an increase in the LED drive current caused by the occurrence of a common mode pulse. The following describes a few illustrative embodiments for performing common mode pulse compensation. It should be noted that although the EOC of the transmitter circuit is described herein as being an LED, the EOC may be any type of light source, including laser diodes and other devices. Similarly, it should be noted that although the OEC of the receiver circuit is described herein as being a photodiode, the OEC may be any type of device that converts optical energy into electrical energy.

Figure 2:
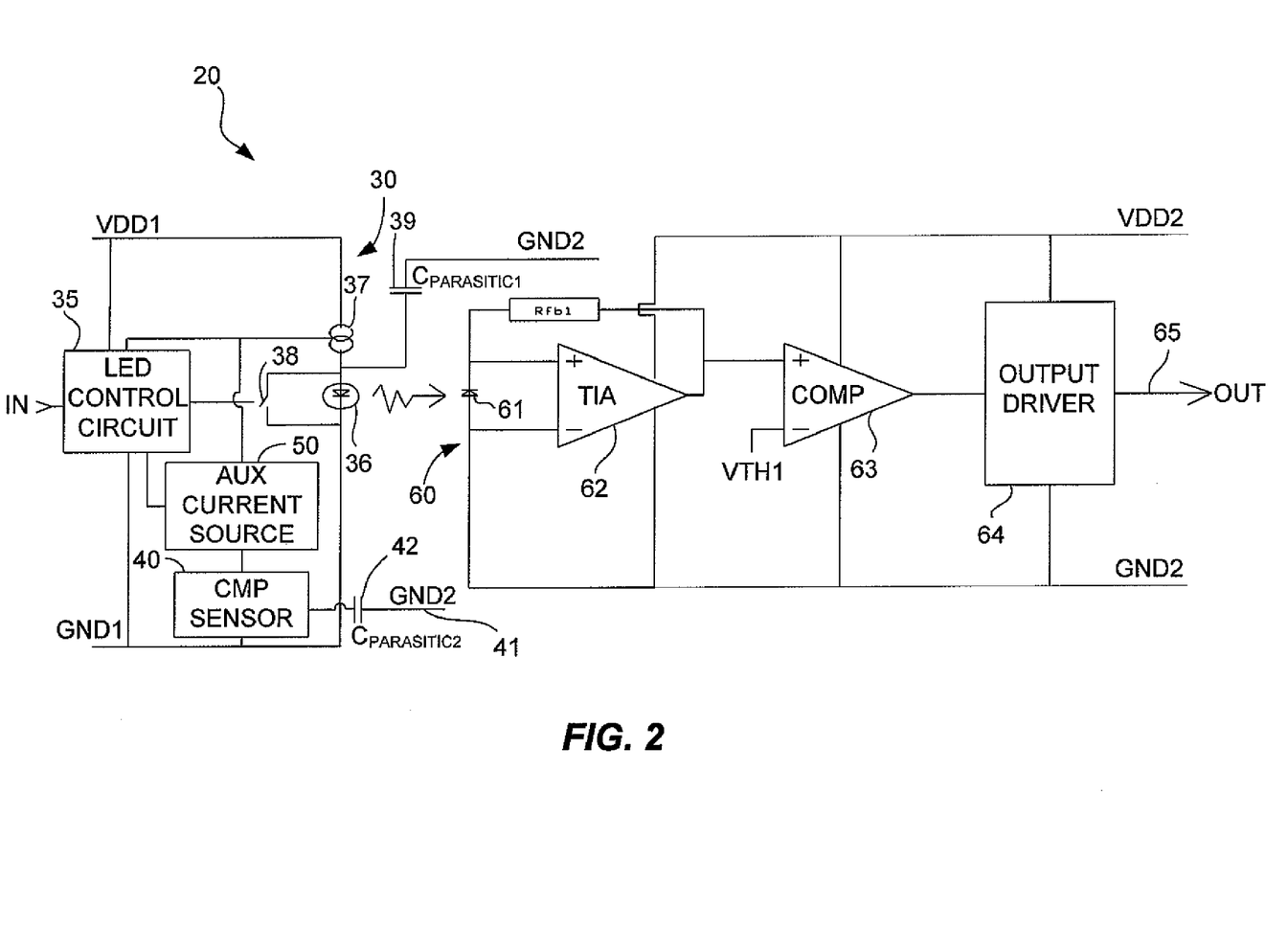
FIG. 2 illustrates a block diagram of an opto-isolator in accordance with an illustrative embodiment of the invention.

FIG. 2 illustrates a block diagram of the opto-isolator 20 in accordance with an illustrative embodiment. Like the opto-isolator 2 shown in FIG. 1, the opto-isolator 20 has a transmitter IC 30 and a receiver IC 60, which are typically implemented in a single IC package. The transmitter IC 30 includes an LED control circuit 35 having input interface logic (not shown) for receiving an electrical input signal to the opto-isolator 20. The LED 36 is typically separate from the transmitter IC 30 and is usually made using a III-V process technology. The LED 36 is connected by wire bonds (not shown) to the transmitter IC 30. A supply voltage VDD1 and a ground reference GND1 are provided to the transmitter IC 30. The transmitter IC 30 includes a current source 37 for turning the LED 36 on and a shorting switch 38 that is controlled by the LED control circuit 35 to ensure that the LED 36 is turned off when it is supposed to be in the Off state.

The capacitor 39 represents the parasitic capacitance Cparasitic1 between the bond wires going to the LED 36 and the ground reference GND2 node of the receiver IC 60. The transmitter IC 30 includes a common mode pulse (CMP) sensor 40 that senses the current on a section of wire 41 having a parasitic capacitance Cparasitic2, represented by capacitor 42. The wire 41 is connected to an input pad (not shown) of the sensor 40 and has an inherent parasitic capacitance to the nearby GND2 of the receiver IC 60. This sensed current corresponds to a common mode pulse. When the sensor 40 senses a common mode pulse having a slope that is sufficiently great to cause the opto-isolator 20 to operate improperly, an auxiliary current source 50 of the transmitter IC 30 outputs a positive or negative logic pulse to the current source 37, depending on whether the sensed slope is positive or negative, as will be described in detail below with reference to FIGS. 3 and 4. The pulse output from the auxiliary current source 50 essentially compensates for perturbations in the drive current caused by the common mode pulses, thereby preventing errors from being caused by the common mode pulses. This ensures that the current source 37 will output a current that is appropriate for driving the LED 36.

Like the receiver IC 4 shown in FIG. 1, the receiver IC 60 of the opto-isolator 20 includes a photodiode 61, a TIA 62, a comparator 63 and an output driver 64. The optical output of the LED 36 is coupled to the photodiode 61 on the receiver IC 60. The photon input to the photodiode 61 produces a corresponding photo current in the diode 61. This current is amplified in the TIA 62 and then the output is sent to the comparator 63. The comparator 63 compares the output from the TIA 62 to a reference voltage, VTH1, to determine whether the output corresponds to a logic 0 or logic 1 state and provides an output signal to the output driver 64, which produces the output drive signal for the opto-isolator 20 at node 65.

The value of Cparasitic2 is typically in the range of 20 fF. The sensor 40 is typically configured to detect a common mode transient with a slope greater than or equal to 10 KV/μsec. In accordance with an embodiment, the sensor 40 outputs a positive logic pulse for positive slopes and outputs a negative logic pulse for negative slopes. The circuitry for the sensor 40 will now be described with reference to FIG. 3.

Figure 3:
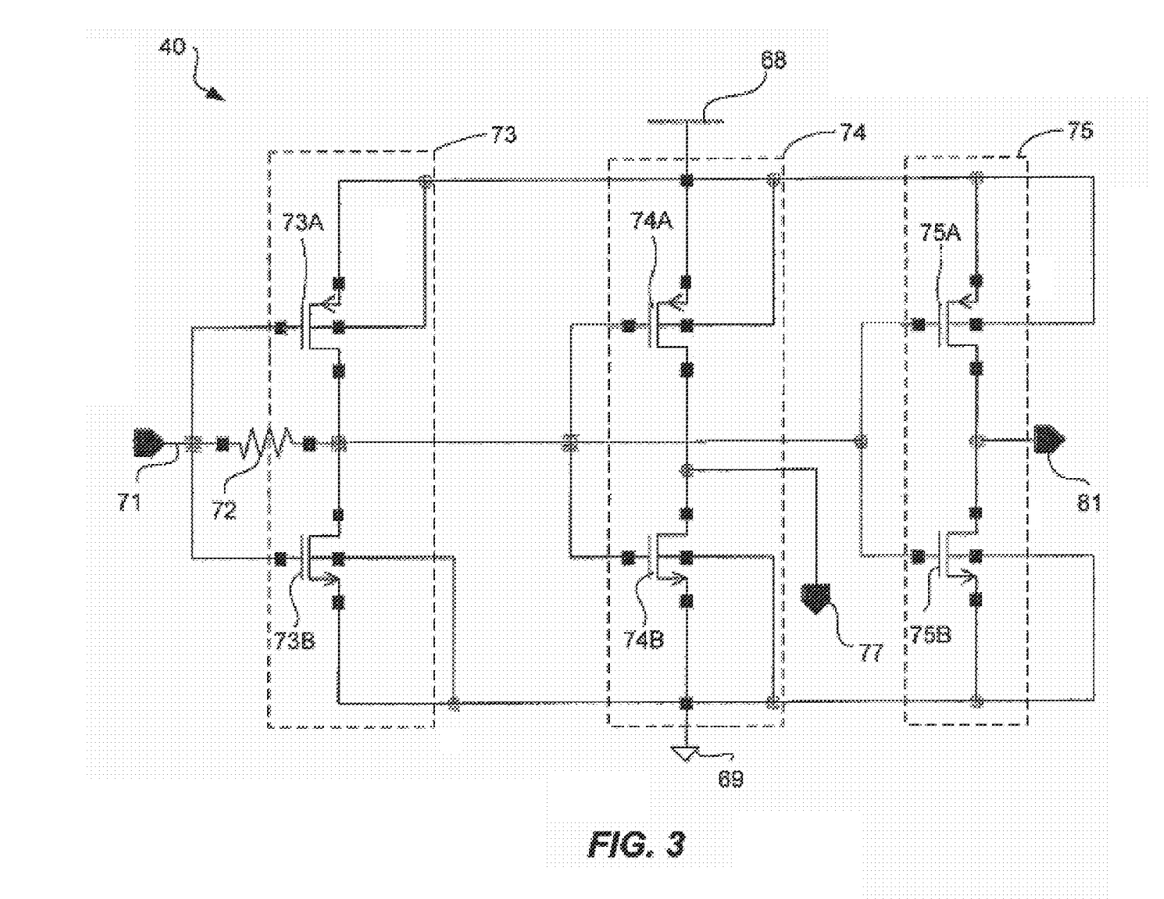
FIG. 3 illustrates a schematic diagram of the sensor of the opto-isolator shown in FIG. 2 in accordance with an embodiment.

FIG. 3 illustrates a schematic diagram of the sensor 40 in accordance with an embodiment. The sensor 40 can be any circuit that is capable of detecting when a common mode pulse having a slope greater than some threshold slope value has occurred, and that is capable of detecting the polarity of the slope, i.e., whether the slope is positive or negative. It will be understood by those skilled in the art, in view of the description being provided herein, that a variety of circuits can be designed and implemented to perform these functions. Therefore, it will be understood that the sensor circuit shown in FIG. 3 is only an example of one circuit configuration that is suitable for performing these functions, and that the invention is not limited to using this particular configuration.

The sensor 40 has an input terminal 71, a resistor 72, three inverters 73, 74 and 75 made up of an metal oxide semiconductor field effect transistors (MOSFETs) 73A, 73B, 74A, 74B, 75A, and 75B, and two output terminals 77 and 81. A supply voltage reference 68 and a ground reference 69 are provided to the circuit 40. The first inverter stage 73 is made up of a p-type MOSFET 73A and an n-type MOSFET 73B. Likewise, the second inverter stage 74 is made up of a p-type MOSFET 74A and an n-type MOSFET 74B. Likewise, the third inverter stage 75 is made up of a p-type MOSFET 75A and an n-type MOSFET 75B.

The input terminal 71 is connected to the wire 41 shown in FIG. 2, which has the parasitic capacitance Cparasitic2. The first inverter 73 having transistors 73A and 73B is self biased to its threshold point, which is very close to one-half of the supply voltage Vdda. The supply voltage Vdda s typically 2.5 volts. The inverter 73 also operates as an amplifier stage. The sizes of the MOSFETs 73A and 73B are chosen so that this stage does not use much supply current, but will respond very quickly to transient pulses that have slopes of 10 KV/μsec or higher. The second inverter stage 74 having MOSFETs 74A and 74B is connected to the output of the first inverter stage 73. The sizes of the MOSFETs 74A and 74B are adjusted so that this inverter will have a threshold above the mid voltage level of Vdda, or Vdda/2. A positive pulse output from the first inverter/amplifier stage 73 will cause a negative output pulse to be output from the second inverter stage 74 having an amplitude that ranges from the vdda supply level down to 0.0 volts. The third inverter 75 has MOSFET sizes chosen such that the threshold point of that stage is below the vdda/2 level. If, for example, the first inverter/amplifier stage 73 produces negative output pulses during the occurrence of a common mode pulse having a negative slope, the third inverter stage 75 will respond with a positive going logic pulse having a magnitude that ranges from about GND1 to about vdda. The pulses output from the second inverter stage 74 at output terminal 77 and from the third inverter stage 75 at output terminal 81 are received by the auxiliary current source 50, which is described below in detail with reference to FIG. 4. The common mode pulse slopes are attenuated and differentiated by the input capacitor 42 (FIG. 2) in combination with the effective input resistance of the amplifier stage 73 of 100 ohms, represented by the resistor 72. The following inverter stages 74 and 75 either respond to the positive or negative pulses from the first stage and produce the out1 and out2 pulses at nodes 77 and 81, respectively.

Figure 4:
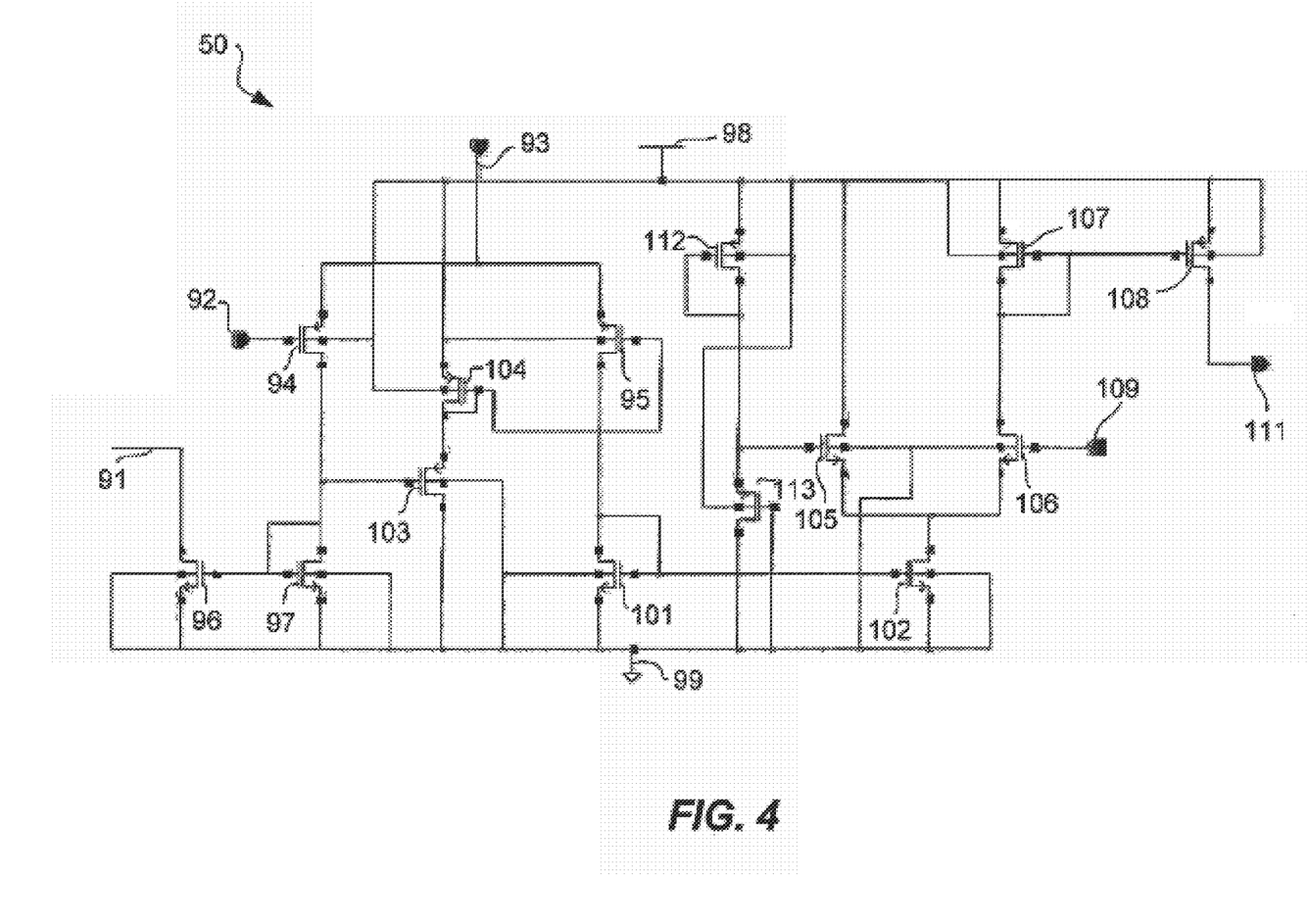
FIG. 4 illustrates a schematic diagram of the auxiliary current source of the opto-isolator shown in FIG. 2 in accordance with an embodiment.

FIG. 4 illustrates a schematic diagram of the auxiliary current source 50 shown in the block diagram of FIG. 2. The auxiliary current source 50 is connected at nodes 91 and 111 to the anode of the LED 36. The left side of the circuit 50 functions to reduce the drive current to the LED 36 while the right side of the circuit 50 functions to increase the drive current to the LED, depending on whether the slope of the common mode pulse is positive or negative. The left side of the circuit 50 has an input node 92 that receives the signal output from the sensor circuit 40 at node 77 of the sensor circuit 40. The right side of the circuit 50 has an input node 109 that receives the signal output from the sensor circuit 40 at node 81 of the sensor circuit 40.

In accordance with an embodiment, the correction current value is set in the LED control circuit 35 so the corrected drive current can be turned off by the LED control circuit 35 when the LED 36 is supposed to be in the Off state. The correction current is input to the circuit 50 at the node 93. The value of the correction current should be equal to:

$$I\_correction = Cparasitic1 * dV/dT,$$

where I_correction is the correction current, Cparasitic1 is the parasitic capacitance between the reference ground GND2 for the receiver IC 60 and the LED anode bond wire, and dV/dT is the slope of the common mode pulse. The LED correction current input at node 93 is typically set at 0.1333 times the current level that is needed to compensate for the losses through the bond wire and Cparasitic1. In accordance with this embodiment, the circuit 50 is configured to increase or decrease the LED drive current by up to 3 mA. This allows the circuit 50 to correct for common mode pulses having slopes ranging from about 10 kV/μsec to about 40 kV/μsec, which is the entire range of slopes that may result in the aforementioned errors.

A supply voltage is provided to the circuit 50 at node 98 and a ground reference is provided to the circuit 50 at node 99. A pair of p-type MOSFETs 94 and 95 of the circuit 50 functions as a current switch for steering the current either to a current sink mirror made up of n-type MOSFET 96 and 97 or to a current source mirror made up of n-type MOSFETs 101 and 102. The current switch pair 94 and 95 is assisted by an assistance circuit made up of p-type MOSFETs 103 and 104, which ensure that MOSFET 96 is actually switched off properly. The nominal level of the pulse received at input node 92 ensures that MOSFET 97 is turned off when it is supposed to be in the Off state. The correction current input at node 93 will be steered to the current mirror comprising MOSFETs 101 and 102 when MOSFET 97 is off. A pair of n-type MOSFETs 105 and 106 functions as a current switch that controls whether or not the current sourcing mirror made up of MOSFETs 101 and 102 is turned on. The source current mirror is made up of p-type MOSFETs 107 and 108. P-type MOSFETs 112 and 113 functions as a bias divider string for dividing the 2.5 volt supply at node 98 down to 1.4 volts.

During operation, node 91 pulls drive current away from the LED 36 when common mode pulses occur that would otherwise cause too much drive current to be provided to the LED 36. Node 111 adds current to the LED drive current when common mode pulses occur that would otherwise cause an inadequate amount of drive current to be provided to the LED 36. In essence, when the sensor 40 senses a negative-slope common mode pulse, the auxiliary current source 50 adds current to the LED drive current. When the sensor 40 senses a positive-slope common mode pulse, the auxiliary current source 50 pulls some of the LED drive current away from the LED 36. In all cases, any increase or decrease in LED drive current caused by the occurrence of a common mode pulse is compensated to ensure that the opto-isolator 20 operates properly.

Experiments performed with the opto-isolator 20 demonstrated that it will operate properly over a wide range of slopes even if the correction current I_correction provided to node 93 of the auxiliary current source circuit 50 is not precisely chosen for the transient event. For example, for a transient event of a common mode pulse having a slope of 30 kV/μsec, and with a Cparasitic1 value of 100 fF and correction current value of 0.4 mA, the result was 3 mA of additional current sourced to the LED when the event slope is in the negative direction and 3 mA sink current when there is excess drive to the LED. This correction is sufficient to ensure that the LED light output stays near the 4.0e-03 level that is desired. As indicated above, the combination of the sensor circuit 40 and the auxiliary current source 50 operates over a range of event slopes from 10 kV/usec to 40 kV/usec. Hence, if the correction current I_correction is set to the mid case of 25 kV/μsec, then even with imperfect matching of the event slopes and the correction current, the On and Off times for the output pulse will not be disturbed relative to pulse transfer without a common mode event.

It is possible, but highly unlikely, that the LED turn-On or turn-Off pulse may occur during a transient event. The case of the common mode event with a positive or negative slope of 10 kV/μsec can be adequately compensated by using a correction current set for a slope of 20 kV/μsec. Both of these cases have been checked over temperature variations and process variations and it was found that the LED drive current was adequately compensated to enable the opto-isolator 20 to operate properly. This may not always be true if the transient events have significantly larger slopes than the slope on which that the selected correction current value is based, so it becomes more important to use a correction current value that is more closely matched to the slope of the event in those cases. However, it is important to note that the duration of fast transient events is sufficiently short that the probability of an LED turn-On or turn-Off transition occurring during the event is small.

Figure 5:
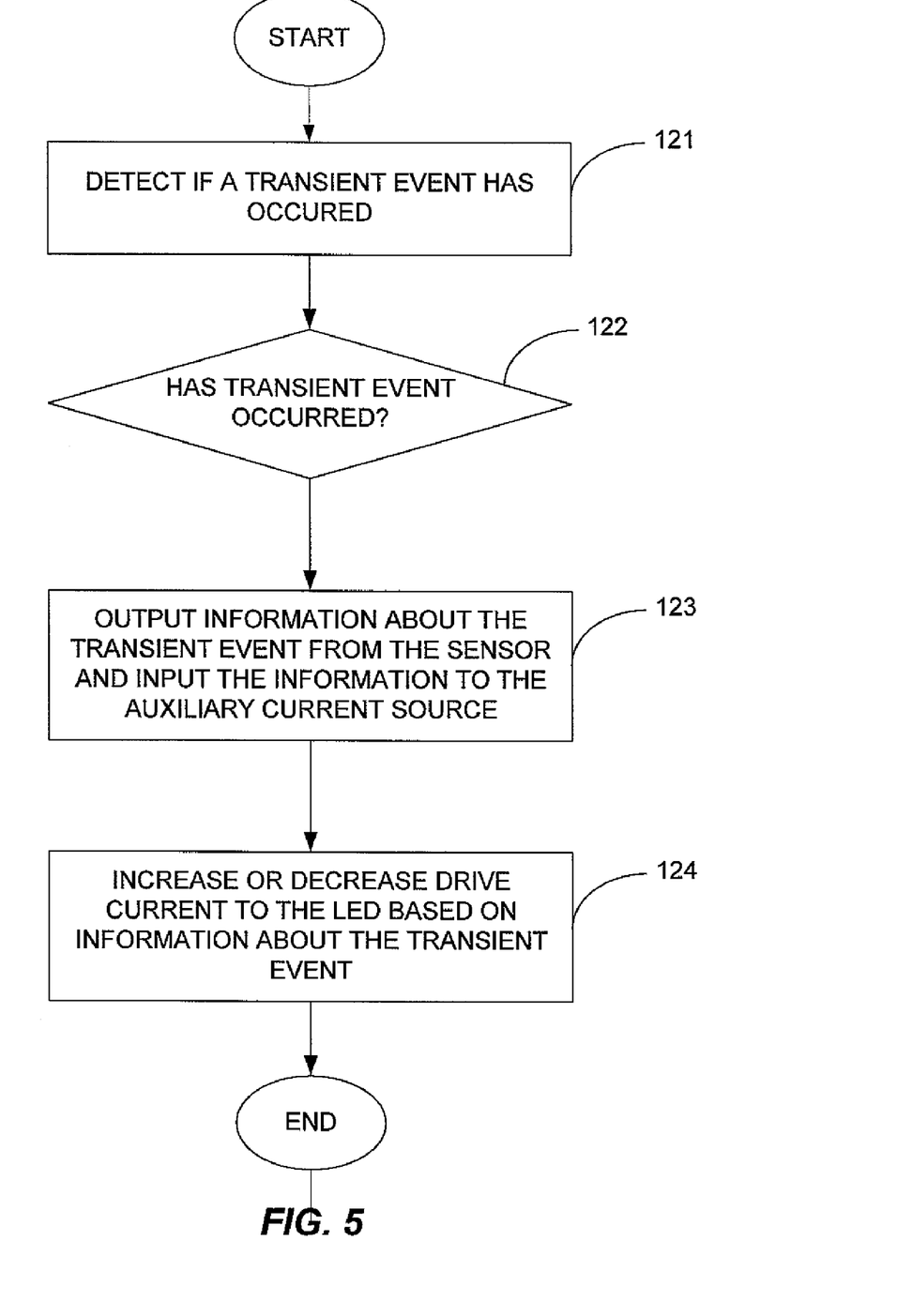
FIG. 5 illustrates a flowchart that represents the method for compensating for the effects of common mode pulses in an opto-isolator accordance with an exemplary embodiment.

FIG. 5 illustrates a flowchart that represents the method in accordance with an exemplary embodiment. As described above, a sensor of the opto-isolator is used to detect whether a transient event has occurred, as indicated by block 121. A decision is made at block 122 as to whether a transient event has been detected. If not, the process returns to block 121. If so, the process proceeds to block 123 where information about the polarity of the transient event (i.e., whether the common mode pulse had a positive or negative slope) is output to the auxiliary current source. At block 124, the auxiliary current source receives the information from the sensor and performs LED drive current compensation based on the information received to produce a corrected LED drive current, which is provided to the LED under control of the LED control circuit.

It should be noted that the invention has been described with reference to illustrative embodiments for the purpose of demonstrating the principles and concepts of the invention. The invention is not limited to these embodiments, as will be understood by those skilled in the art in view of the description provided herein. For example, the circuits shown in FIGS. 3 and 4 are merely examples of embodiments that are suitable for performing the functions needed to compensate the LED drive current. A variety of circuits can be designed to perform these tasks, and all such variations or modifications to the embodiments described herein are within the scope of the invention. Also, while the opto-isolator has been described as having a transmitter and a receiver IC that are contained in the same IC package, these may be implemented in two or more ICs, and may even be implemented using discrete components. Other variations and modifications may be made to the embodiments described herein, as will be understood by those skilled in the art, and such modifications and variations are within the scope of the invention.

What is claimed is:

1. An opto-isolator comprising:
a transmitter circuit having an electrical-to-optical converter (EOC) control circuit for controlling an EOC, a primary current source for generating a drive current for driving an EOC, an auxiliary current source for providing a corrected drive current for driving an EOC by increasing or decreasing the drive current generated by the primary current source, and a sensor for sensing if a transient event has occurred and, if so, providing information about the transient event to the auxiliary current source;
the electrical-to-optical converter (EOC) operatively connected to the transmitter circuit, the EOC receiving the corrected drive current when the EOC control circuit causes the corrected drive current to be provided to the EOC, the EOC producing an optical signal based on the received corrected drive current; and
a receiver circuit having an optical-to-electrical converter (OEC), an amplifier, a comparator and an output driver, wherein the GEC receives the optical signal produced by the EOC and converts the optical signal into an electrical signal, the amplifier amplifying the electrical signal from an output of the OEC, the comparator comparing the amplified electrical signal to a reference signal and producing an electrical output signal based on the comparison, the output driver receiving the electrical output signal and producing an electrical output drive signal for the opto-isolator, wherein the sensor senses whether a transient event has occurred by determining whether a common mode pulse waveform has occurred between a reference ground of the transmitter circuit and a reference ground of the receiver circuit.

2. The opto-isolator of claim 1, wherein the information provided by the sensor to the auxiliary current source includes at least information relating to a slope of the common mode pulse waveform.

3. The opto-isolator of claim 2, wherein the information relating to the slope includes at least a polarity of the slope.

4. The opto-isolator of claim 2, wherein the sensor is configured to sense common mode pulse waveforms having slopes that are greater than or equal to about 10 kilovolts per microsecond (kV/μsec).

5. The opto-isolator of claim 2, wherein the sensor senses a transient event based on the receipt by the sensor of current in a wire connected to the sensor, the wire having an inherent parasitic capacitance.

6. The opto-isolator of claim 2, wherein the auxiliary current source increases or decreases the drive current generated by the primary current source based on the slope of the common mode pulse waveform as determined by the sensor, and wherein the auxiliary current source decreases the drive current generated by the primary current source by pulling a portion of the drive current away from the EOC, and wherein the auxiliary current source increases the drive current generated by the primary current source by adding current to the drive current generated by the primary current source.

7. The opto-isolator of claim 2, wherein the amount by which the auxiliary current source increases or decreases the drive current generated by the primary current source is based on a correction current value I_correction, provided to the auxiliary current source by the EOC control circuit.

8. The opto-isolator of claim 7, wherein the correction current I_correction is related to a parasitic capacitance, Cparasitic1, existing between the ground reference of the receiver circuit and wire bonds connected to the LED and to the slope, dV/dt, of the common mode pulse waveform as:

$$I\_correction = Cparasitic1 * dV/dt.$$

9. A method for compensating for common mode pulses occurring in an opto-isolator, the method comprising:
- in a sensor of a transmitter circuit of an opto-isolator, detecting if a common mode pulse waveform has occurred in an opto-isolator between a reference ground of the transmitter circuit and a reference ground of a receiver circuit;
- if the sensor detects that a common mode pulse waveform has occurred, sending information about the common mode pulse occurrence to an auxiliary current source of the opto-isolator; and
- in the auxiliary current source of the opto-isolator, receiving the information about the common mode pulse waveform occurrence and, based on the received information, increasing or decreasing an electrical-to-optical converter (EOC) drive current generated by a primary current source to provide a corrected EOC drive current to an EOC of the opto-isolator.

10. The method of claim 9, wherein the information provided by the sensor to the auxiliary current source includes information relating to a slope of the common mode pulse waveform.

11. The method of claim 10, wherein the information relating to the slope includes a polarity of the slope.

12. The method of claim 11, wherein the sensor is configured to sense common mode pulse waveforms having slopes that are greater than or equal to about 10 kilovolts per microsecond (kV/μsec).

13. The method of claim 11, wherein the sensor senses a common mode pulse waveform based on the receipt by the sensor of current in a wire connected to the sensor, the wire having an inherent parasitic capacitance.

14. The method of claim 12, wherein the auxiliary current source increases or decreases the EOC drive current generated by the primary current source based on the slope of the common mode pulse waveform as determined by the sensor, and wherein the auxiliary current source decreases the drive current generated by the primary current source by pulling a portion of the drive current away from the EOC, and wherein the auxiliary current source increases the drive current generated by the primary current source by adding current to the drive current generated by the primary current source.

15. The method of claim 12, wherein the amount by which the auxiliary current source increases or decreases the drive current generated by the primary current source is based on a correction current value I_correction, provided to the auxiliary current source by an EOC control circuit of the transmitter circuit of the opto-isolator.

16. The method of claim 15, wherein the correction current $I_{13}$ correction is related to a parasitic capacitance, Cparasitic1, existing between the ground reference of the receiver circuit and wire bonds connected to the EOC and to the slope, dV/dt, of the common mode pulse waveform as:

$$I\_correction = Cparasitic1 * dV/dt.$$

* * * * *